United States Patent
Hassan et al.

(10) Patent No.: US 7,680,278 B2
(45) Date of Patent: Mar. 16, 2010

(54) DOMINO SCHEME FOR WIRELESS CRYPTOGRAPHIC COMMUNICATION AND COMMUNICATION METHOD INCORPORATING SAME

(75) Inventors: Amer Hassan, Kirkland, WA (US); Christopher J. Corbett, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1354 days.

(21) Appl. No.: 10/771,929

(22) Filed: Feb. 4, 2004

(65) Prior Publication Data

US 2005/0169469 A1 Aug. 4, 2005

(51) Int. Cl.
- H04N 7/167 (2006.01)
- H04K 1/00 (2006.01)
- H04L 9/00 (2006.01)
- H04L 5/12 (2006.01)
- H04J 9/00 (2006.01)

(52) U.S. Cl. .......................... 380/210; 380/43; 380/44; 380/274; 380/31; 370/203; 370/215

(58) Field of Classification Search ................ 370/203, 370/215; 380/21, 43–44, 270–274, 31, 210
See application file for complete search history.

(56) References Cited

U.S. PATENT DOCUMENTS

| | | | | |
|---|---|---|---|---|
| 5,187,591 A | * | 2/1993 | Guy et al. | 358/425 |
| 5,371,794 A | * | 12/1994 | Diffie et al. | 713/156 |
| 5,764,699 A | * | 6/1998 | Needham et al. | 375/261 |
| 5,864,625 A | * | 1/1999 | Rutledge | 380/31 |
| 5,978,650 A | * | 11/1999 | Fischer et al. | 725/73 |
| 5,987,071 A | * | 11/1999 | Iwamatsu et al. | 375/298 |
| 6,052,785 A | | 4/2000 | Lin et al. | |
| 6,125,148 A | * | 9/2000 | Frodigh et al. | 375/261 |
| 6,400,928 B1 | * | 6/2002 | Khullar et al. | 455/67.11 |
| 6,515,980 B1 | * | 2/2003 | Bottomley | 370/342 |
| 6,539,093 B1 | | 3/2003 | Asad et al. | |
| 6,715,073 B1 | | 3/2004 | An et al. | |
| 6,909,755 B2 | * | 6/2005 | Erving | 375/264 |
| 6,952,439 B1 | * | 10/2005 | Lindsey et al. | 375/140 |
| 6,987,754 B2 | * | 1/2006 | Shahar et al. | 370/349 |
| 7,010,057 B2 | * | 3/2006 | Vayrynen et al. | 375/295 |
| 7,016,297 B2 | * | 3/2006 | Tang et al. | 370/204 |
| 7,215,713 B2 | * | 5/2007 | Walker et al. | 375/261 |
| 7,415,043 B2 | * | 8/2008 | Kaewell et al. | 370/479 |
| 7,421,075 B2 | * | 9/2008 | Hassan et al. | 380/31 |
| 2002/0032001 A1 | * | 3/2002 | Fischer et al. | 455/3.01 |

(Continued)

OTHER PUBLICATIONS

U.S. Appl. No. 10/735,992, filed Dec. 15, 2003, Hassan et al.

*Primary Examiner*—William R Korzuch
*Assistant Examiner*—Trang Doan
(74) *Attorney, Agent, or Firm*—Wolf, Greenfield & Sacks, P.C.

(57) ABSTRACT

A system and method for secure wireless cryptographic communication among participants in a wireless computing network is presented. This secure communication method is based on a random modulation technique and a domino match. Once the initial modulation scheme is selected, each data transmission includes an indication of what modulation scheme should be used for the next data transmission. If a given number of bits are to be used, the modulation scheme for the final transmission may be limited to complete the bit transfer. The bit value assignments within particular modulation schemes may also be varied for each subsequent transmission.

28 Claims, 10 Drawing Sheets

U.S. PATENT DOCUMENTS

| | | | |
|---|---|---|---|
| 2003/0002495 A1* | 1/2003 | Shahar et al. | 370/389 |
| 2003/0031122 A1* | 2/2003 | Kim et al. | 370/209 |
| 2003/0081690 A1* | 5/2003 | Kim et al. | 375/264 |
| 2003/0095561 A1* | 5/2003 | Hwang | 370/432 |
| 2003/0103585 A1* | 6/2003 | Kim et al. | 375/340 |
| 2003/0117896 A1* | 6/2003 | Sakuma et al. | 367/81 |
| 2003/0202574 A1* | 10/2003 | Budka et al. | 375/227 |
| 2004/0038685 A1* | 2/2004 | Nakabayashi | 455/452.2 |
| 2004/0076229 A1* | 4/2004 | Ishikawa | 375/240.01 |
| 2004/0091031 A1* | 5/2004 | Dodgson et al. | 375/222 |
| 2004/0091054 A1* | 5/2004 | Rastegar et al. | 375/259 |
| 2004/0091061 A1* | 5/2004 | Liu et al. | 375/308 |
| 2004/0136465 A1* | 7/2004 | Hwang et al. | 375/267 |
| 2004/0136469 A1* | 7/2004 | Wang et al. | 375/295 |
| 2004/0157560 A1* | 8/2004 | Yamasaki | 455/63.1 |
| 2004/0161054 A1* | 8/2004 | Murakami et al. | 375/298 |
| 2004/0203992 A1* | 10/2004 | Yun | 455/522 |
| 2004/0258169 A1* | 12/2004 | Matsunaga | 375/260 |
| 2005/0031054 A1* | 2/2005 | Horisaki | 375/341 |
| 2005/0123138 A1* | 6/2005 | Abe et al. | 380/255 |
| 2005/0128935 A1* | 6/2005 | Tang et al. | 370/208 |

* cited by examiner

DOMINO SCHEME FOR WIRELESS CRYPTOGRAPHIC COMMUNICATION AND COMMUNICATION METHOD INCORPORATING SAME

FIELD OF THE INVENTION

The present invention relates generally to wireless communications, and more particularly to cryptographic communication methods for secure, encrypted wireless communications.

BACKGROUND OF THE INVENTION

It has long been known that wireless communications provide significant benefits in terms of user mobility and convenience. With the recent advances in wireless communication protocols, wireless device battery life, and other supporting technologies, the application of such wireless communications into the computing environment has greatly increased productivity and convenience for computer users, both at the professional and home consumer level. Indeed, the high data rates available through modern wireless communication protocols has enabled corporate users to embrace such wireless computing capabilities for their computing infrastructure.

Indeed, the ability to form ad hoc wireless networks in addition to the ability to connect in an infrastructure mode to a corporate computer network allows corporate workers to collaborate, share documents, and conduct productive meetings without the hassles and constraints imposed by a wired only computer network. These mobile computing users may now have complete access to their network resources regardless of their physical location within the corporation. Still further, in an ad hoc mode, mobile computing users may conduct meetings at remote sites, such as an airport, with other wireless computing users. Indeed, such ad hoc wireless networks may be formed with corporate employees as well as customers or other visitors to a corporation. The internal security mechanisms will then ensure that the customer or other visitor may participate in the ad hoc meeting, but cannot gain access to the wired corporate infrastructure of the corporation.

Unfortunately, the broadcast nature of wireless communications exposes a significant threat that the information exchanged during such communications may be intercepted by malicious third parties. That is, because the information exchanged during a wireless computing session is broadcast wirelessly through the air to the other participants in the wireless computing session, a malicious entity can also receive this information. Such a malicious entity can then learn valuable information, including personal, financial, business information and passwords that may expose a further risk to the corporate computing infrastructure or the home computer network.

While it may be impossible to prevent a malicious eavesdropper from receiving the wireless transmission, it is relatively easy to protect the content of these broadcasts through simple encryption techniques that are well-known and practiced currently in the wireless communications arts. That is, while a malicious eavesdropper may still be able to intercept the wireless communication transmission, since the information being transmitted is encrypted, this malicious eavesdropper cannot decipher the information that he has intercepted. Indeed, modern private key encryption techniques effectively register the interception of such encrypted transmissions completely useless, garbled data. As such, most sensitive and corporate wireless computing communications utilize some form of data encryption for all data exchanged in a wireless computing session.

As is well-known in the art, such data encryption methods utilize a shared key or secret known only to the authorized participants in the wireless communication session. In this way, each party can encrypt its information prior to transmitting it wirelessly to the other participants in the computing session, who then each use the shared secret or key to encrypt the information for use. Any malicious third party eavesdropper receiving this wireless broadcast is unable to decrypt this information since he is not privy to the secret or key known by the authorized users.

However, for the system to work, each of the authorized uses in the wireless computing session must know the shared secret or key. The problem becomes, therefore, how to communicate this shared secret or key to each of the authorized participants in a wireless computing system without inadvertently disclosing this key to a malicious third party eavesdropper. Currently, this problem is handled in various ways, all of which detract from the benefits provided by wireless communications itself.

One method of exchanging the shared secret or key is to require each of the participants to physically couple to a wired network so that the key can be exchanged among the participants of the wireless computing session. However, requiring the participants of a wireless computing session to first physically couple their wireless computing devices together via a wire is burdensome and not desired by wireless computer users. Alternatively, the shared secret or key may be exchanged between the participants in an offline manner, such as though voice communication, the passing of notes, etc., however, these techniques are also undesired, and are more prone to inadvertent discovery by a malicious third party. Shared secret or key exchanges may also be made through close range infrared (IR) communications between the wireless computing devices. However, such techniques also entail a certain amount of risk that the IR transmission may be intercepted by a malicious third party eavesdropper unless extraordinary measures are taken during this shared secret or key exchange. At the corporate level, wireless computing users may be required to first log in to their wired computing network via a docking station or LAN cable adapter to receive the infrastructure shared secret or key for the day before they are able to begin wireless computing at work. Once again, such requirements for wired communications prior to engaging in secure wireless communications complicates the process, deters users from engaging in such wireless communications, and significantly detracts from the advantages provided through such advanced wireless communications technologies.

There exists, therefore, a need in the art for a secure method of wireless communication that eliminates the requirement for shared key encryption and the associated problems relating to shared secret or key exchange among authorized users of a wireless computing network.

BRIEF SUMMARY OF THE INVENTION

The inventive concepts disclosed in this application involve a new and improved system and method for secure wireless information exchange among participants in a wireless computing network. More particularly, the present invention is directed to a new and improved system and method for secure wireless cryptographic communication whereby the authorized participants in the wireless communication session need not share the cryptographic key before the wireless computing session begins. Even more specifically, the system and method of the present invention provide a new cryptographic wireless communication scheme based on an availability of a set of modulation techniques and a domino match. This allows secure wireless communication with little complexity, and forces a third party malicious eavesdropper into an exhaustive search to break the encryption of the wireless communication utilizing the wireless communication methods of the present invention. The eavesdropper's view of modulation selection is random. This method may be implemented either in the driver of devices or natively in the operating system of the computing device where multiple modulation schemes can apply.

In one embodiment of the present invention, a suite of wireless communication modulation techniques are made available to the wireless computing users. The system and method of the present invention then varies the modulation technique utilized to transmit data packets containing a number of bits of information from which the complete information packet may be generated. Such modulation techniques available in the suite includes for example, BPSK at 6 and 9 megabits per second data rates, QPSK at 12 and 18 megabits per second, 16 QAM at 27 megabits per second, 16 QAM (IEEE) at 24 megabits per second, 16 QAM at 36 megabits per second, 64 QAM at 54 megabits per second, and 64 QAM (IEEE) at 48 megabits per second.

A feature of the invention, therefore, is a randomizing of the selection of the modulation technique used by each transmission of packets by following a domino pattern. That is, at one time modulation may be 16 QAM, at another time the modulation is 8 PSK, then followed by 64 QAM, and so forth. A third party malicious eavesdropper trying to decode these schemes and not knowing which modulation is used will have to guess which scheme is being selected. As such, there is a high probability that such a malicious eavesdropper will arrive at a cryptographic sequence mismatched with the one utilized by the authorized participants. These authorized participants are able to determine what modulation to use for succeeding packets by each user. This is accomplished in one embodiment of the present invention by including information in the transmitted packet dictating to the other user what technique to select in the next transmission. This modulation transmission selection may be governed by the total number of bits required to complete the transmission. In an alternate embodiment, truncation of excess bits may be accomplished, thereby eliminating the constraint on the selection of the modulation technique.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
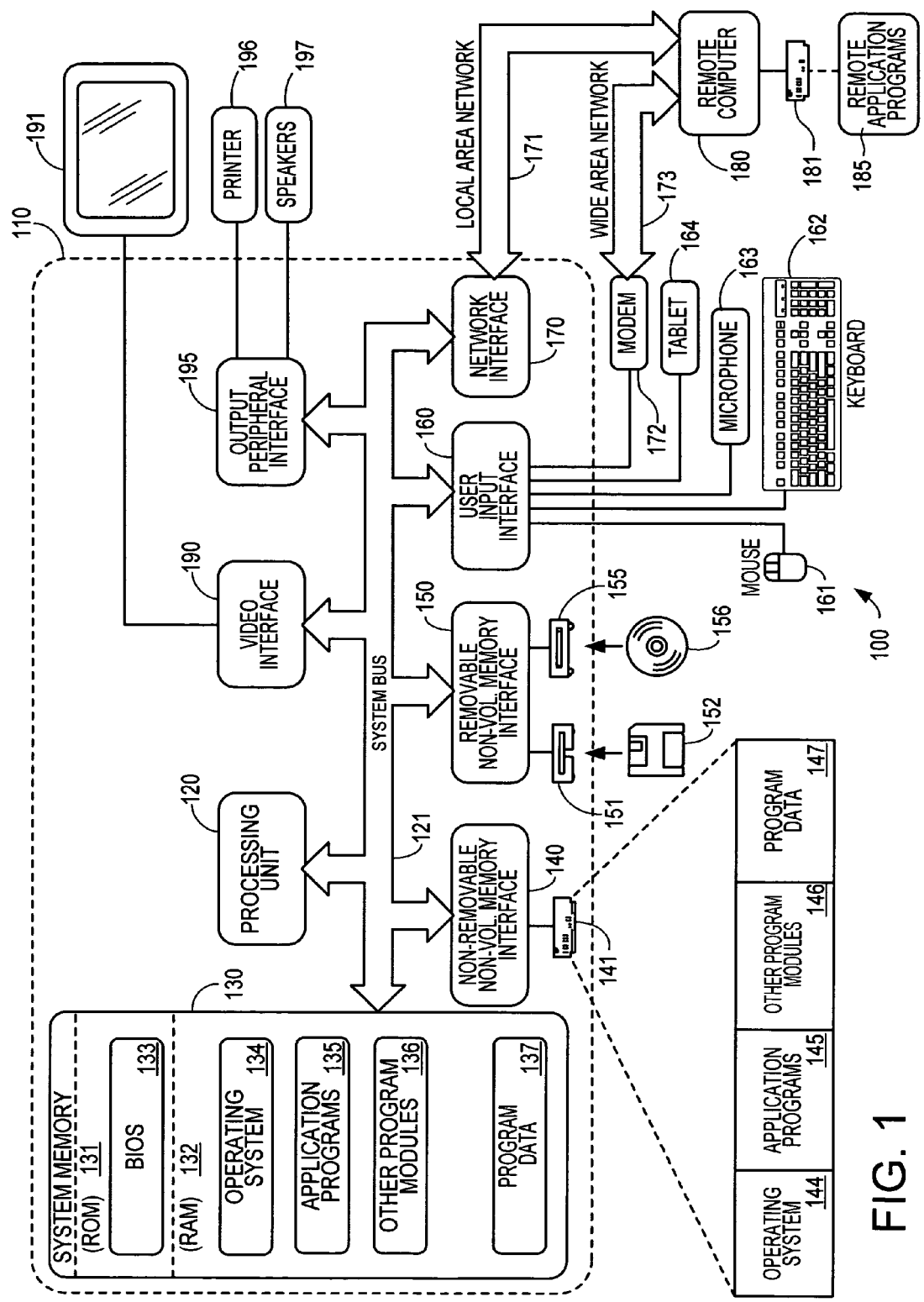
FIG. 1 is a block diagram generally illustrating an exemplary computer system on which the present invention may reside.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
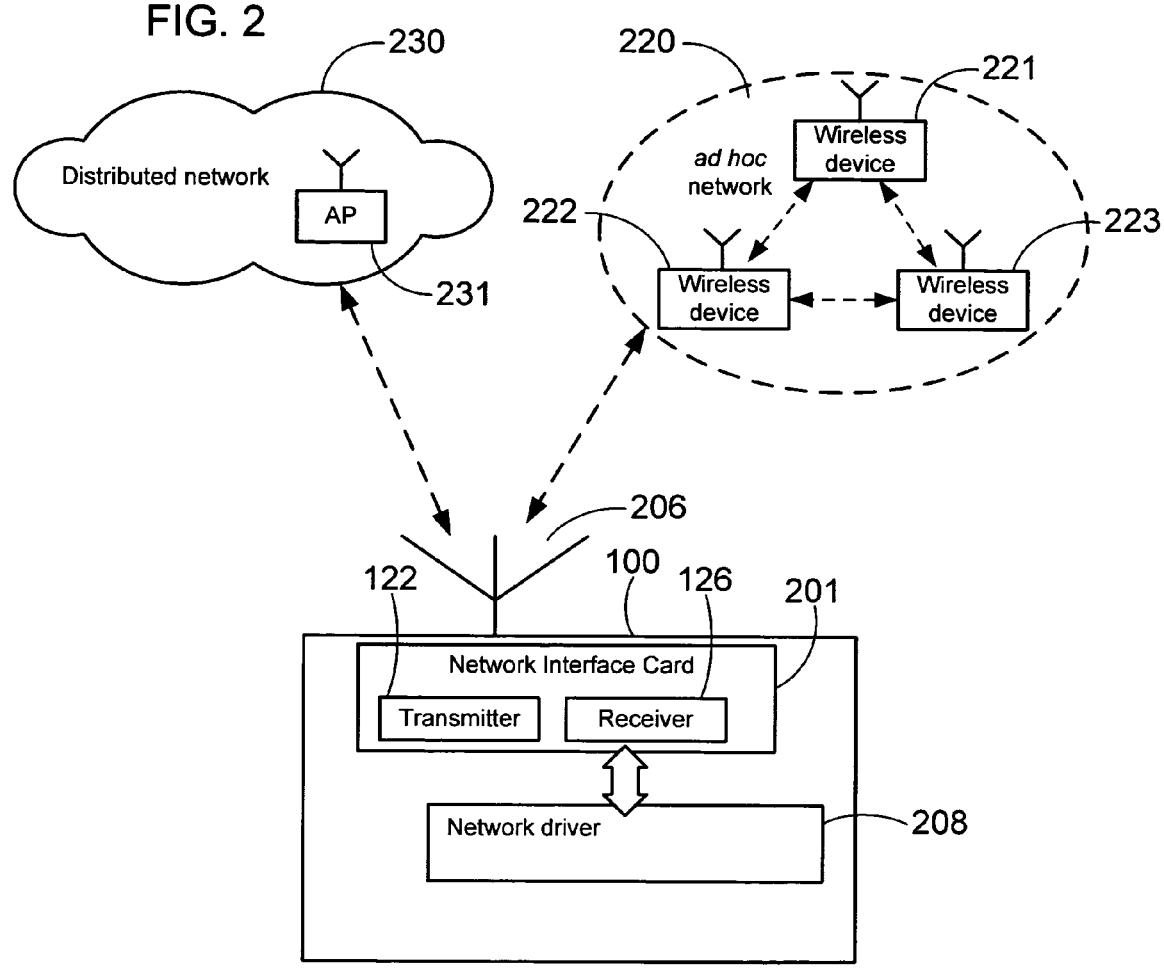
FIG. 2 is a simplified wireless environment diagram illustrating infrastructure and ad hoc wireless network connections secured by an embodiment of the system and methods of the present invention.

With particular applicability to the system and method of the present invention, the device 100 is configured as a wireless mobile device. To that end, the device 100 is provided with a portable power source 120, such as a battery pack, a fuel cell, or the like. The power source 120 provides power for computations and wireless data transmissions by the device 100. As shown in FIG. 2, the wireless computing device 100 may include a network interface card (NIC) 201 for wirelessly communicating with different types of wireless networks. The NIC 201 includes a transmitter 122, which is coupled to an antenna 206 for transmitting data wirelessly over a suitable frequency channel. A receiver 126 is also coupled to the antenna 206 for receiving communication packets wirelessly transmitted from the networks that the device is communicating with. The network interface module 201 and the antenna 206 are part of the communication connections 112 in FIG. 1. In one embodiment, the network interface module 201 employs wireless configuration service over the IEEE 802.11 wireless connections to ease network configuration, including infrastructure networks and ad hoc networks. An exemplary network interface module is PCMCIA wireless card. It will be appreciated that the interface type and physical configuration of the network interface module is not critical to the invention. For instance, the interface type could be PCI or another type and the network interface module does not have to reside on a separate card. It may be included on the motherboard of the computer or even possibly built into the processor in the future.

Through the wireless network interface module, the wireless computing device 100 may communicate with different types of wireless networks. For instance, in the illustrated environment of FIG. 2, the wireless device 100 may be connected wirelessly to an infrastructure network 230 through an access point 231 thereof. The wireless device 100 may also be part of a peer-to-peer network 220, also referred to as an ad hoc network, that includes other wireless devices, such as the wireless devices 221, 222, and 223. Before connecting to either the access point 231 of the infrastructure network or the ad hoc network 220, the wireless device 100 may be in a state of searching for devices that belong to the network by periodically scanning actively by sending probe requests and scanning for probe response signals transmitted by the access point or other devices. Alternatively, the wireless device 100 may search passively by scanning for beacons transmitted by Access Points. A network driver 208 controls the operation of the network interface module 201. The network driver 208 is either part of the operating system of the wireless device 100 or a separate executable program running on the wireless device 100.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 3:
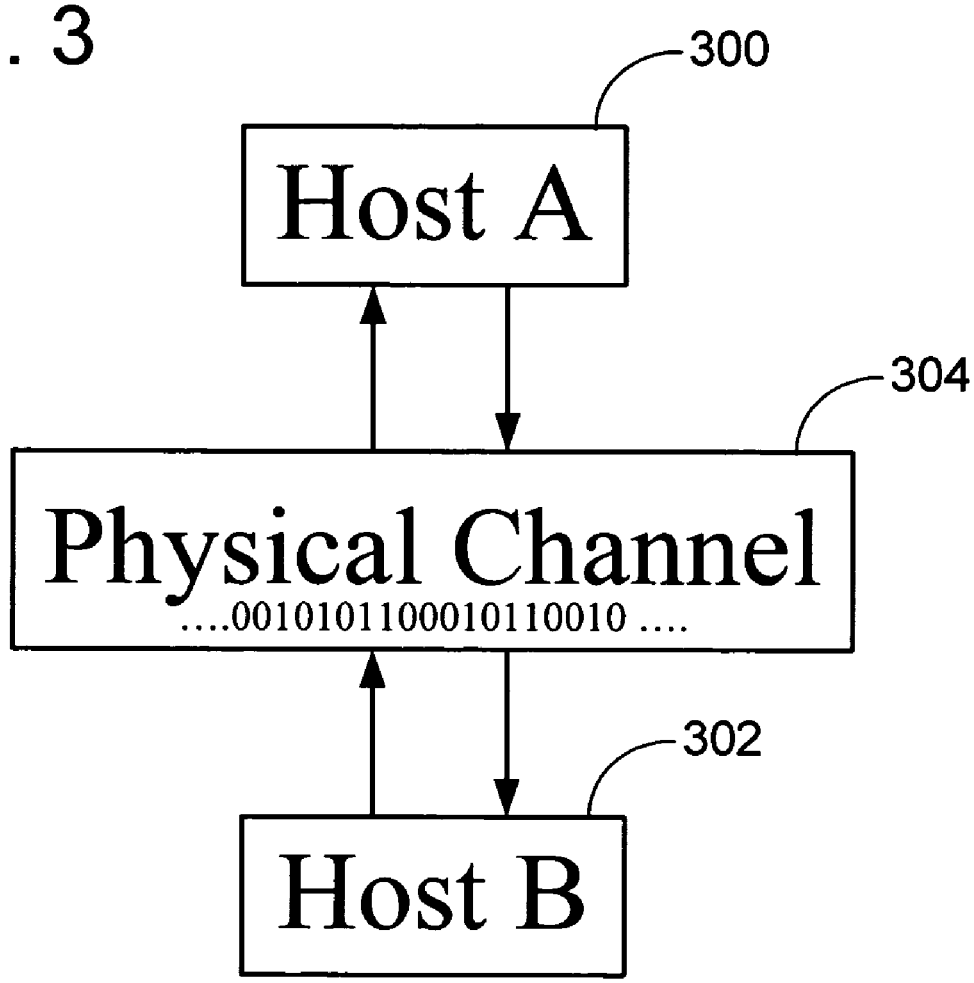
FIG. 3 is a simplified communications diagram illustrating communication between two hosts via a physical channel.

The concept of communicating digital data, at the abstract level, consists of host A 300 wanting to send a stream of data to host B 302 over some physical media. This is shown in simplified fashion in FIG. 3. A physical media is often called a physical channel 304. Typical examples of physical channels 302 include optical fiber, copper wire, coaxial cable, and free space for wireless, acoustic, infrared (IR) and the like transmissions.

Figure 4:
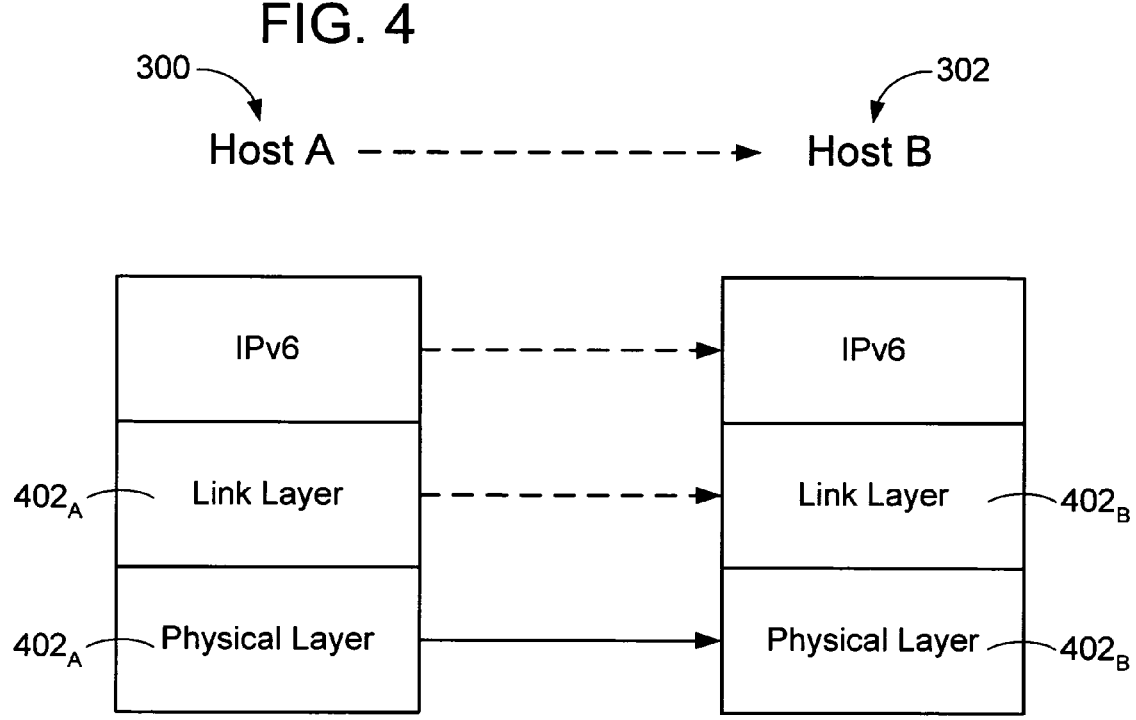
FIG. 4 is a block diagram of the ISO model for host-to-host communications.

In most digital communications systems, Host A 300 is not able to connect directly to Host B 302 without some form of initializing handshake. As discussed above, Host A 300 and B 302 may also want to communicate in secret. Therefore, Host A 300 and Host B 302 must develop a way to communicate using the same "language". Preferably, this "language" cannot be understood by any malicious third party eavesdropper. Host to host communication is illustrated generically using the International Organization for Standardization (ISO) references in FIG. 4. While a discussion of this well known model is avoided here in the interest of brevity, the following discussion will utilize this model to describe various aspects of the present invention.

The system and methods of the present invention deal primarily with establishing the synchronization, and varying the use, of the physical layer device (PHY) layer $400_A$, $400_B$ and Link layer $402_A$, $402_B$ for Host A 300 and Host B 302. Specifically, the present invention matches the PHY layers $400_A$, $400_B$ and the link layers $402_A$, $402_B$ for signal for transmission to the channel being used at any given time, and varies the channel, modulation technique, etc. over time in order to provide for secure communication as will be described more fully below.

Figure 5:
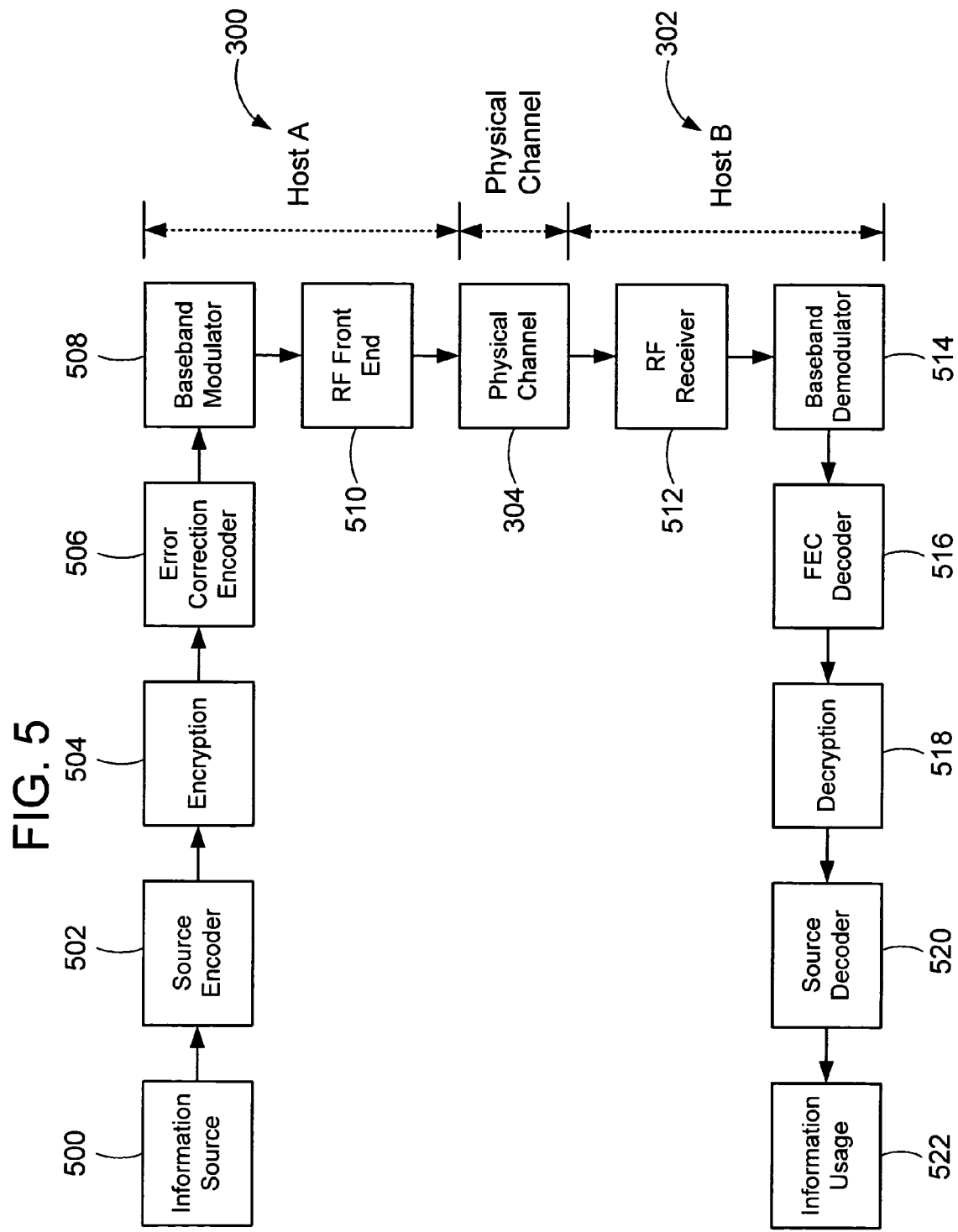
FIG. 5 is a block diagram of a digital communications system that may benefit from the system and method of the present invention.

A typical communications block diagram for the PHY and Link layers for digital communications is shown in FIG. 5. In this figure, the information flow illustrated is from Host A 300 via physical channel 304 to Host B 302, although those skilled in the art will recognize that the communications flow may occur, and usually does, in both directions. As illustrated, information source 500 provides the information to be communicated to Host B 302 to a source encoder 502. Once the information has been encoded, it is passed to encryption block 504 wherein the information is encrypted, preferably with a shared secret or key generated as discussed more fully below. This encrypted information is then passed to an error correction encoder 506, and from there to the baseband modulator 508 which modulates the encrypted information for transmission by the radio frequency (RF) front end transmitter 501. The modulated, encrypted information is transmitted through the physical channel 304.

At Host B 302, the wirelessly transmitted information is received from the physical channel 304 by the RF receiver 512. At the receiver the modulated signal is noisy and distorted due to channel and receiver impairments. Once received, the signal containing the information is passed to the baseband demodulator 514 and the forward error correction (FEC) decoder 516 so that errors due to the noise and distortions are corrected if the number of errors is not too high. The information is then decrypted via decryption block 518. This decrypted information is then passed to a source decoder 520. The source decoder decompresses the information. At this point, the information is in a form that may be used 522 by Host B.

Advantageously, the communicators (Host A 300 and Host B 302) have available a set of constellations or modulations that may be used for transmission of the information through the physical channel. In wireless communication standards, such as 802.11a, 802.11 g, and HiperLAN2, the following Table 1 presents the constellations available for transmission.

TABLE 1

| Modulation | FEC Coding Rate | Bit Rate (Mbps) |
| --- | --- | --- |
| BPSK | 1/2 | 6 |
| BPSK | 3/4 | 9 |
| QPSK | 1/2 | 12 |
| QPSK | 3/4 | 18 |
| 16 QAM | 9/16 | 27 |
| 16 QAM (IEEE) | 1/2 | 24 |
| 16 QAM | 3/4 | 36 |
| 64 QAM | 3/4 | 54 |
| 64 QAM (IEEE) | 2/3 | 48 |

Figure 6:
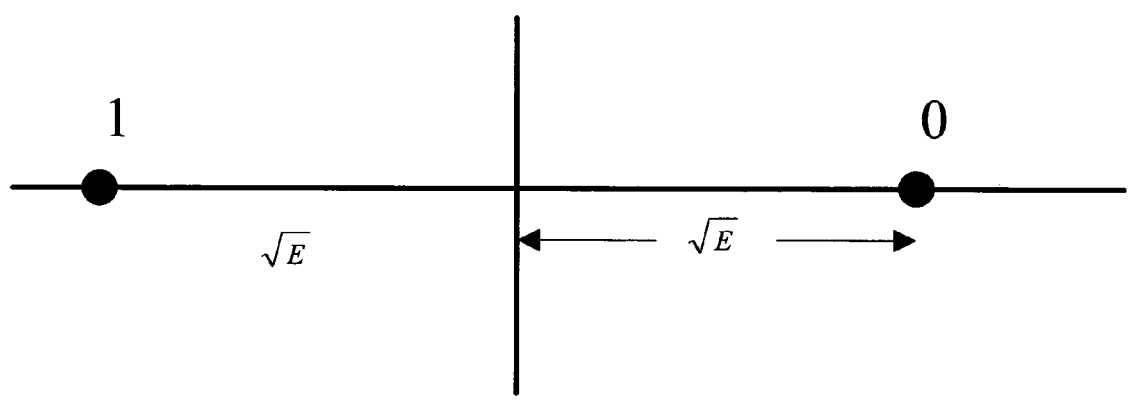
FIG. 6 is a modulation phase diagram illustrating data transmission utilizing binary phase shift keying (BPSK)
Figure 7:
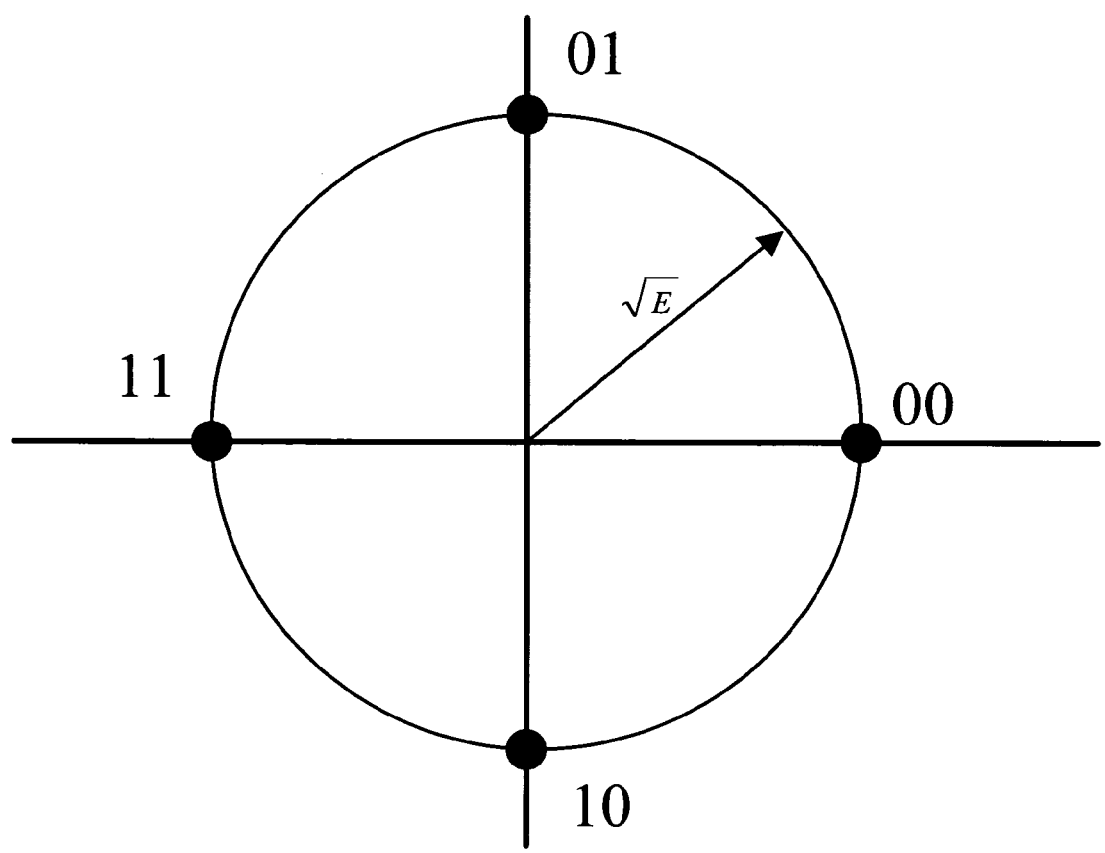
FIG. 7 is a modulation phase diagram illustrating data transmission utilizing quadrature phase shift keying (QPSK)

These modulation schemes carry the information in the phase of the carrier. For example and as is well know in the art, in binary phase shift keying (BPSK), to transmit a "0" the phase of the transmitted signal is 0°, and to transmit a "1" the phase of the transmitted signal is 180° (or π radians). This is shown in FIG. 6. In quadrature phase shift keying (QPSK) modulation two bits at a time are represented as a point on the phase space as shown in FIG. 7. For example, to transmit a "01" using QSPK modulation, the phase of the transmitted signal is 90°, and to transmit a "11" the phase of the transmitted signal is 180°.

As will be recognized from the foregoing description, the encryption/decryption blocks 504/518 in FIG. 5 provide data integrity, that is secrecy, to communicated packets. There are two methods to perform such a task, to wit public key cryptography, and private key (or symmetric) cryptography. Private key methods are in common use in wireless systems. As the name indicates, there is a need to have two identical keys at the encryption block 504 and at the decryption block 518. These keys are used to generate what is called cipher text at the output of the encryption, and plain text at the output of the decryption.

One of the most important and difficult issues in such secure communications, however, is key distribution. As discussed above, the prior methods of distribution were based on certificates, required that wired communications preceded secured wireless communications, or the keys were inserted in a smart card and physically distributed. Other methods utilized private keys that are provided by a trusted party. All these methods are limited as indicated above. However, through the system and methods of the present invention two users can perform secure communications without the encryption/decryption sub-blocks 504/518 illustrated in FIG. 5. The invention in particular makes use of two elements of the digital communications system shown in FIG. 5, to wit the randomness of the noise in the radio channel, and the set of Baseband modulation schemes available at the Baseband modulator 508 and Baseband demodulator 514, e.g. those illustrated above in Table 1.

Specifically, the system and methods of the present invention take advantage of the availability of these varied constellations or modulation schemes to establish secure communications without having to establish a session key at all. That is, the system and methods of the present invention utilize a random selection of the modulation used for the transmission of each packet of data between Host A and Host B. For example, one packet of information may be transmitted using 16 quadrature amplitude modulation (QAM), while at another time the modulation is 8 phase shift keying (PSK), then followed by 64 QAM, and so forth. An adversary trying to decode the information being transmitted utilizing these schemes would have to guess which scheme is being selected for each data packet. Recognizing the large number of modulation techniques available, there is a high probability that such a malicious eavesdropper would arrive at a cryptographic sequence mismatched with the right one. As such, this malicious party would not be able to correctly decipher the information packets transmitted between the authorized members. Through this technique, the modulation constellations are selected and varied to ensure secure wireless communications. This is unlike other wireless communication techniques where an optimized modulation constellation for the channel is selected for the wireless session and the information is encrypted during all transmissions with the exchanged key.

Figure 8:
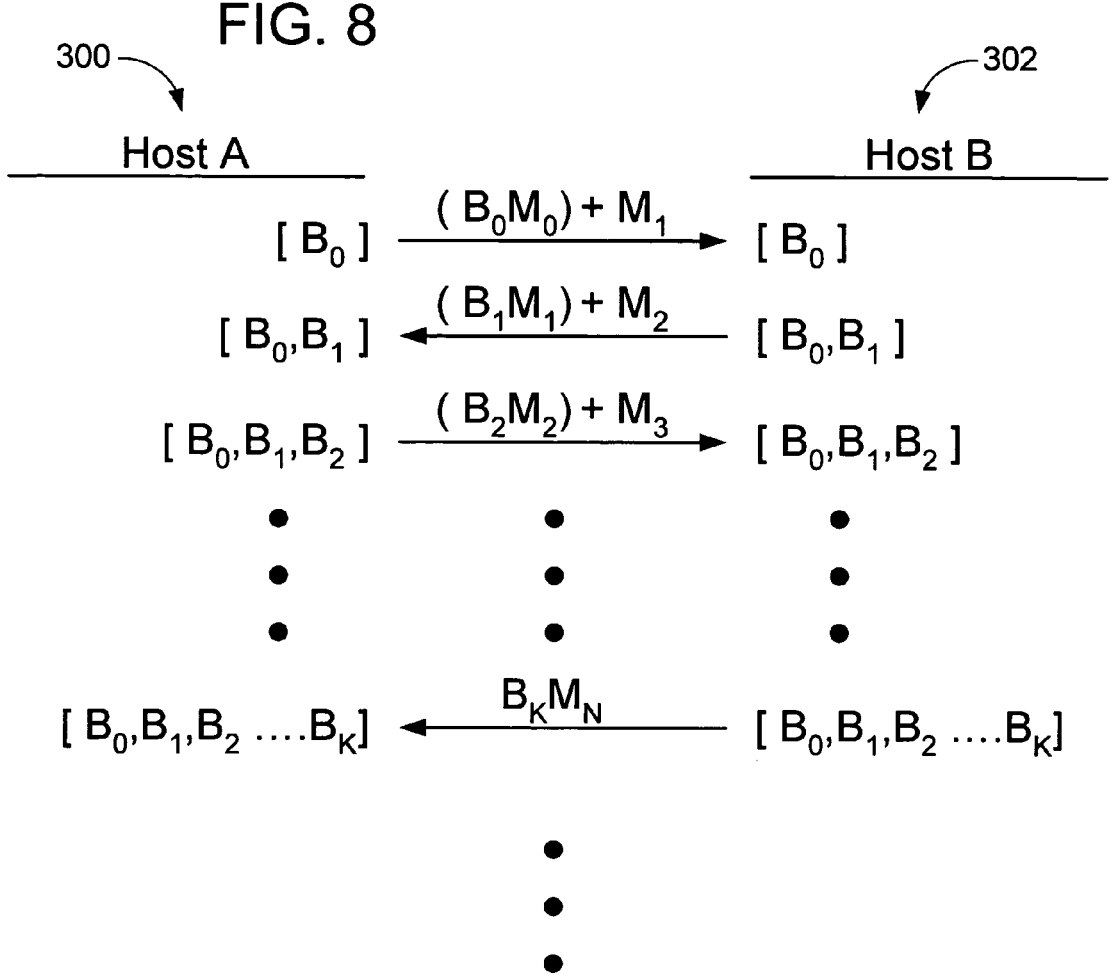
FIG. 8 is a simplified communications diagram illustrating an embodiment of the wireless online cryptographic communication method of the present invention.

In accordance with one embodiment of the present invention, the two hosts are able to determine what modulation scheme to use for the transmission of each subsequent packet by dictating to the other user what technique to select in the next transmission. This technique is illustrated in FIG. 8. In this exemplary embodiment of the present invention, the length of the transmitted packet of information is K ($B_1$, $B_2$, ... $B_K$). Host A 300 and Host B 302 use a set of modulation schemes for each transmission indexed by $\{1, \ldots, N\}$, N being the number of modulation schemes or constellations used. Host A 300 and Host B 302 share a short key in advance established by public key methods such as Diffie-Hellman key exchange method, or using Kerberos. This short key is an index to what signal constellation is used initially (referred to herein as $M_0$). $M_0$=b(n0) is a binary representation of integer n0 where: $1 \leq n0 \leq N$. Preferably, there is a one-to-one mapping between the integers and the signal constellations so that each host is able to properly initially transmit and receive using the proper modulation scheme or constellation $M_0$.

Once the initial modulation scheme has been determined, Host A 300 transmits an initial packet ($B_0$) to Host B 302a using $M_0$. This is represented in FIG. 8 as ($B_0M_0$). It is noted that $B_0$ (as well as subsequent transmissions $B_1, B_2, \ldots B_N$) may be a single bit, or a grouping of multiple bits depending on which modulation scheme is selected, as will be made clear though an example discussed below. Host B knowing a priori $M_0$ will be able to demodulate this first transmission on the channel to determine $B_0$. This first transmission ends with an index $M_1$ pointing to the next modulation scheme that user B 302 must use. $M_1$ can be chosen in one embodiment randomly as a function of the output of a pseudorandom noise generator. In this embodiment, let the notation <a b> of two sequences a and b denote the concatenation of the two bit streams; then $M_1$ must meet the constraint that the length of sequence <$M_0M_1$> is less than or equal to K, the length of the data package to be transmitted.

Host B 302 transmits data to user A 300 using the modulation mapped by b(n1), designated $M_1$ in FIG. 8. Host A 300 knows that user B 302 is using modulation $M_1$ since Host A 300 requested that modulation from Host B 302. Therefore, Host A 300 will be able to demodulate the data ($B_1$) from Host B 302. The packet ends with index $M_2$ pointing to the next modulation scheme requested by Host B 302 from Host A 300. The constraint on $M_2$ is the that the length of the sequence <$M_0$ $M_1$ $M_2$> is less than or equal to K. This process continues k times, until the number of bits passed is equal to the number of bits required to be transferred, K. At a stage i the following constraint holds: <$M_0$ $M_1$ ... $M_i$> is a sequence of length less than or equal to K. As such, $M_K$ will be constrained with <$M_0$ $M_1$ ... $M_K$> is a sequence equal to K. In this wireless cryptographic communication method, the Hosts 300, 302 are interested in secure communications, and not the total throughput of the system. That is, the choice of modulation is to confuse a third party, not to match the modulation to the channel.

As is now apparent, both Host A 300 and Host B 302 used constellations n0, n1, n2, ... nk. The integer k is determined by the length of the information packet to be transmitted. During each stage of transmitting a modulation symbol, both Host A 300 and Host B 302 keep count of the total number of bits buffered from time 0 to time ni (ni</=nk). The total number of bits will have to add up to the total number of bits needed for the packet transmission K.

For example, assume the two Hosts 300, 302 want to transmit an information packet having 10 bits. In this example also assume that Host A 300 and Host B 302 agree that initial key modulation scheme $M_0$ is QPSK. Host A 300 sends data to Host B 302 using QPSK. The end of the data, Host A 300 requests that Host B 302 transmit data to Host A 300 using BPSK modulation. Since QPSK transmits two bits at a time (see FIG. 7), the total count of bits at this stage is two, leaving eight more bits to be exchanged to complete the information packet. These bits in this example are 0 and 1 such that the accumulation of bits at this point equals [0 1].

Host B 302 sends data to Host A 300 using BPSK as requested by Host A 300. At the end of the data, Host B 302 asks Host A to use 16 QAM modulation. The total number of bits accumulated at this point is three, which is equal to the previous two bits plus the extra bit (0) transmitted using BPSK, i.e. BPSK transmits a single bit at a time as illustrated in FIG. 6. The accumulation of bits at both Hosts is now equal to [0 1 0]. Host A 300 next sends data to Host B 302 using 16 QAM modulation and requests that Host B 302 transmit in the next round using 8 PSK. The total number of bits at this point is equal to seven since four more bits (1001) are added due to the 16 QAM modulation. The accumulation of bits at both Hosts is now equal to [0 1 0 1 0 0 1]. At this point three bits are needed to complete the total exchange of ten bits, and the last transmission is coming up. Therefore, the request is forced to 8 PSK. Host B 302 sends packets to Host A 300 using 8 PSK. The 8 PSK adds an additional 3 bits (101) for a total of 10 bits accumulated, which is the number required for the information packet in this exemplary embodiment. The accumulation of bits at both Hosts is now [0 1 0 1 0 0 1 1 0 1].

The total number of bits in this example is 2+1+4+3=10 bits. Table 2 below shows the decoded bits for the intended users and what bits an adversary has to choose from.

TABLE 2

| | QPSK | BPSK | 16QAM | 8PSK |
| --- | --- | --- | --- | --- |
| User bits | 0 1 | 0 | 1001 | 101 |
| Adversary possible bits | 0 | 0 | 0 | 0 |
| | 1 | 1 | 1 | 1 |
| | 00 | 00 | 00 | 00 |
| | 01 | 01 | 01 | 01 |
| | 10 | 10 | 10 | 10 |
| | 11 | 11 | 11 | 11 |
| | 000 | 000 | 000 | 000 |
| | 001 | 001 | 001 | 001 |

TABLE 2-continued

| QPSK | BPSK | 16QAM | 8PSK |
| --- | --- | --- | --- |
| 010 | 010 | 010 | 010 |
| 011 | 011 | 011 | 011 |
| 100 | 100 | 100 | 100 |
| 101 | 101 | 101 | 101 |
| 110 | 110 | 110 | 110 |
| 111 | 111 | 111 | 111 |
| 0000 | 0000 | 0000 | 0000 |
| 0001 | 0001 | 0001 | 0001 |
| 0010 | 0010 | 0010 | 0010 |
| 0011 | 0011 | 0011 | 0011 |
| 0100 | 0100 | 0100 | 0100 |
| 0101 | 0101 | 0101 | 0101 |
| 0110 | 0110 | 0110 | 0110 |
| 0111 | 0111 | 0111 | 0111 |
| 1000 | 1000 | 1000 | 1000 |
| 1001 | 1001 | 1001 | 1001 |
| 1010 | 1010 | 1010 | 1010 |
| 1011 | 1011 | 1011 | 1011 |
| 1100 | 1100 | 1100 | 1100 |
| 1101 | 1101 | 1101 | 1101 |
| 1110 | 1110 | 1110 | 1110 |
| 1111 | 1111 | 1111 | 1111 |

In this example where only BPSK, QPSK, 8 PSK, and 16 QAM modulation are used, it is noted that the intended users sequence is (with high probability) equal to [0 1 0 1 0 0 1 1 0 1]. However, the adversary is forced to look at all possible combinations of the packets as indicated in the Table 2 above. In this case, the adversary will have to choose one of 30 subsequences in each time interval. This results in 30×30× 30×30=810000 possible combinations from which the adversary must choose, and this with only four symbol intervals used. It is simple to find out how many times an adversary is forced to try all possible combinations, which equals 2^10=1024. For a practical 50 symbol interval, for instance, the search for an adversary is too complex and exceeds those of the communicators. This results in a high probability that an adversary will not be able to maliciously break the encryption for the wireless session.

In an alternate embodiment of the wireless cryptographic communication method of the present invention, bit truncation of end bits is utilized, which removes the constraint on $M_i$ for any value of i as discussed above. That is, instead of limiting the selection of the modulation scheme so that the length of the bits transferred satisfies the constraint that the length of the sequence <$M_0$, $M_1$, ... $M_i$> is a sequence of length less than or equal to K, and the constraint that $M_k$ be selected so that the length of sequence <$M_0$, $M_1$, ... $M_k$> is equal to K, any bits in excess of K are simply truncated. The information data packet, then, is the first K bits of transmitted information. In this embodiment of the present invention, in the example given above, the last transmission would not have been forced to 8 PSK to supply the final three bits of the ten bit information packet. Instead, e.g., if 16 QAM were used for this last transmission, the last bit of the four bit 16 QAM transmission would simply be ignored.

Figure 9:
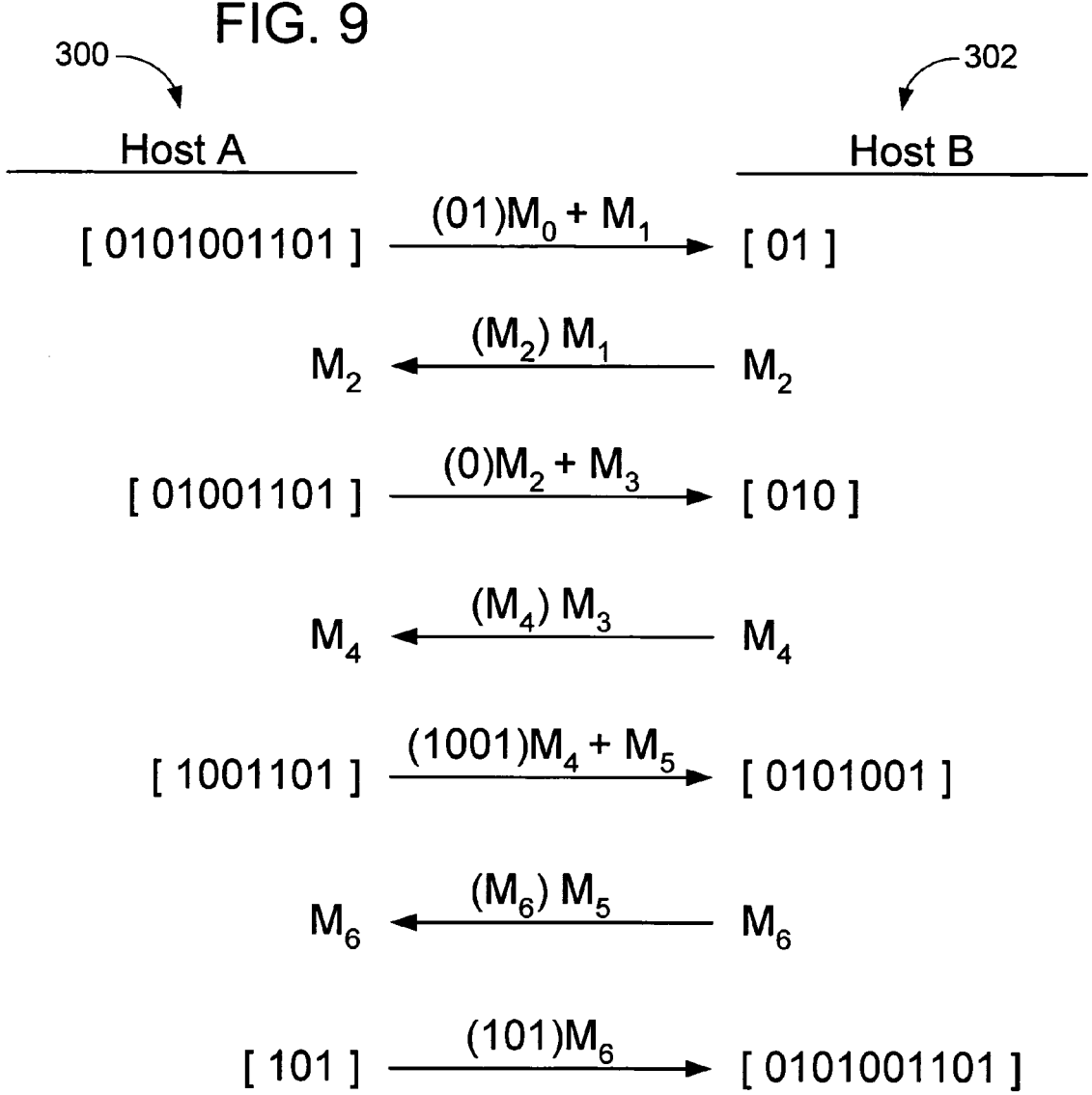
FIG. 9 is a simplified communications diagram illustrating a further embodiment of the wireless online cryptographic communication method of the present invention.

If instead of a data exchange, Host A 300 simply desired to transmit a data packet to Host B 302, the communication method of the present invention would proceed as illustrated in the example of FIG. 9. Specifically, if Host A 300 wanted to transmit the ten bit data packet [0101001101] to Host B 302, Host A 300 would utilize the initial modulation scheme $M_0$ to transmit a first portion of the data packet to Host B 302. The number of bits in this transmission is dependent on the modulation scheme chosen. In one embodiment of the present invention that does not utilize truncation, the modulation scheme for each transmission is constrained such that the number of bits transmitted, when added to the number of bits of the data packet that have already been transmitted, must be equal to or less than K, the total number of bits in the data packet.

In this example, as with the example of FIG. 8, assume that Host A 300 and Host B 302 agree that initial key modulation scheme $M_0$ is QPSK. It should be noted, however, that any modulation scheme that meets the above constraint can be selected as the initial modulation scheme, and that the common selection in these two examples is made simply to allow an understanding of the invention without unduly complicating the examples given. At the initial step of this example, Host A 300 sends a portion of the data packet to Host B 302 using QPSK. At the end of the data portion, Host A 300 requests that Host B 302 respond to Host A 300 using modulation $M_1$, which can be any modulation scheme without constraint. Since QPSK transmits two bits at a time (see FIG. 7), the total number of bits that have been transmitted at this stage is two, leaving eight more bits to be transmitted to complete the information packet. These bits in this example are 0 and 1 such that the accumulation of bits at Host B 302 at this point equals [0 1].

Host B 302 then selects a modulation scheme $M_2$ to use for the next transmission of data, constrained in this embodiment only by the constraint discussed above. Host B then sends an indication of this next desired modulation scheme, BPSK ($M_2$), to Host A 300 using modulation $M_1$ as requested by Host A 300. Host A then transmits the next portion of the data packet to Host B 302 using BPSK ($M_2$) modulation as requested. The total number of bits accumulated at this point is three, which is equal to the previous two bits plus the extra bit (0) transmitted using BPSK, i.e. BPSK transmits a single bit at a time as illustrated in FIG. 6. The accumulation of bits at Host B 302 is now equal to [0 1 0]. Host A also provides an indication of a next modulation scheme $M_3$ to be used by Host B 302 to respond to Host A.

Host B 302 then selects a next modulation scheme $M_4$ to be used by Host A in the next data transmission. The selection of $M_4$ is constrained as discussed above, and is selected in this example to by 16 QAM. Host B 302 then sends an indication of this modulation scheme $M_4$ to Host A 300 using modulation scheme $M_3$ as requested by Host A 300. Host A then transmits the next data portion to Host B 302 using 16 QAM ($M_4$) modulation and requests that Host B 302 respond using modulation scheme $M_5$. The total number of bits at this point is equal to seven since four more bits (1001) are added due to the 16 QAM modulation. The accumulation of bits at Host B 302 is now equal to [0 1 0 1 0 0 1]. At this point three bits are needed to complete the total exchange of ten bits.

Host B 302 then selects a next modulation scheme $M_6$ to be used by Host A in the next data transmission. The selection of $M_6$ is constrained as discussed above. In this example, Host B selects 8 PSK for $M_6$. Since 8 PSK transmits three bits at a time, this selection is proper and indicates that the final transmission is expected. Host B 302 sends $M_6$ to Host A 300 $M_5$ as requested. Host A then transmits the final three bits (101) using 8 PSK for a total of 10 bits transmitted to Host B 302, which is the number required for the information packet in this exemplary embodiment. The accumulation of bits at Host B is now [0 1 0 1 0 0 1 1 0 1]. It is noted that Host A 300 may also transmit a suggested modulation scheme $M_7$ (not shown) if continuing communications are to occur between the two hosts. In which case, $M_7$ would serve as the initial modulation scheme for the next data transfer.

Figure 10:
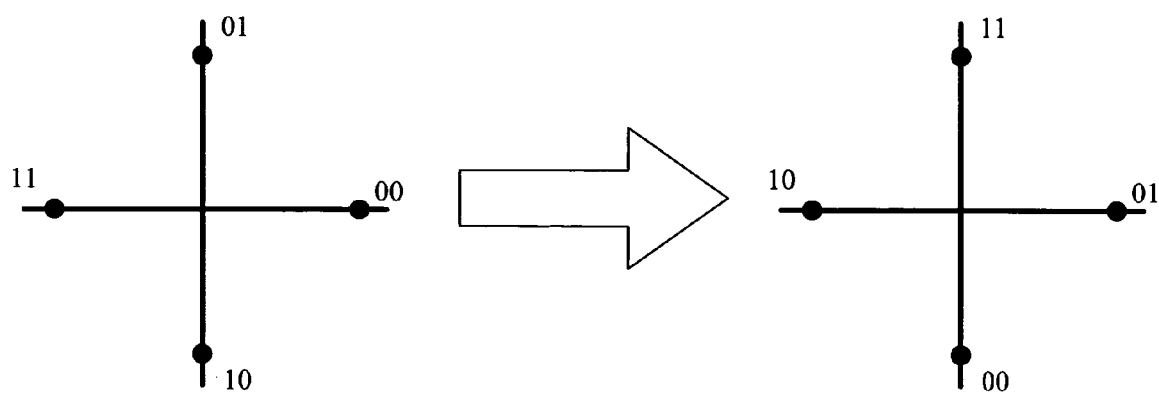
FIG. 10 is a graphical illustration of one embodiment of an alternate modulation varying method that may be used in an embodiment of the present invention for secure wireless communication.

FIG. 10 illustrates an alternate exemplary embodiment of the present invention wherein the assignment of bit values for a given constellation is varied as opposed to or in addition to the variation in the constellation itself to form the different modulation schemes. That is, while still using, for example, QPSK modulation, the Hosts can agree on a reassignment of the bit values for a given phase transmission. In the first graph governing a first transmission, the bit value of [1 1] is given to a phase displacement of 180°, while the same displacement in the second transmission is governed by the bit assignments illustrated in the second graph, to wit [1 0]. Without knowing the bit reassignment scheme, a malicious third party eavesdropper will not be able to determine the bits transmitted, even if this malicious third party were demodulating the transmission using the correct constellation, for example QPSK illustrated in FIG. 10. As such, the term modulation scheme as used herein includes the constellation and/or the bit assignment scheme.

As will be apparent to those skilled in the art in view of the foregoing, the communication method of the present invention is also applicable to certain wire line systems where a set of modulation schemes are available. This is true, for instance, in high rate DSL modems (VDSL). As such, the system and methods of the present invention are important in wire line high security transmission.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of securely communicating a data packet of length of K bits between a first host and a second host, the method comprising the steps of:
    selecting an initial transmit modulation scheme for transmission between the first host and the second host;
    randomly selecting by the first host a receive modulation scheme;
    transmitting by the first host to the second host, encoded according to the transmit modulation scheme, only a portion of the packet and an indication of the receive modulation scheme;
    receiving by the first host from the second host, encoded with the receive modulation scheme, an indication of a subsequent modulation scheme; and
    on the first host, iteratively repeating the steps of randomly selecting a receive modulation scheme, transmitting only a portion of the packet and receiving an indication of a subsequent modulation scheme, with the step of transmitting in each iteration comprising transmitting a different portion of the packet and using as a transmit modulation scheme the subsequent modulation scheme received in the prior iteration.

2. The method of claim 1, wherein randomly selecting a receive modulation scheme comprises selecting based on the output of a pseudorandom number generator a constellation and/or bit assignment.

3. The method of claim 2, wherein, in each iteration, transmitting the portion of the packet comprises transmitting the portion of the packet in a symbol of the transmit modulation scheme.

4. The method of claim 1, further comprising the steps of:
monitoring an amount of bits exchanged; and
selecting a final modulation scheme for a final data exchange between the first host and the second host such that a number of bits conveyed by the final modulation scheme added to the amount of bits exchanged is equal to K.

5. The method of claim 1, wherein the step of selecting an initial modulation scheme comprises the step of sharing a short key established by a public key method, the short key providing an index to the initial modulation scheme.

6. The method of claim 5, wherein the step of sharing a short key established by a public key method comprises the step of sharing a short key established by a Diffie-Hellman key exchange method.

7. The method of claim 5, wherein the step of sharing a short key established by a public key method comprises the step of sharing a short key established using Kerberos.

8. The method of claim 1, wherein the step of selecting an initial modulation scheme comprises the step of selecting an initial constellation.

9. The method of claim 1, wherein the step of selecting an initial modulation scheme comprises the step of selecting an initial bit assignment for a constellation.

10. A method of securely transmitting a data packet between a first host and a second host, the method comprising the steps of:
on the first host:
transmitting a first portion of the data packet from the first host to the second host;
continuing transmission of subsequent portions of the data packet from the first host to the second host until an entirety of the data packet has been transmitted, wherein each transmission from the first host uses varying constellations selected based on an indication received from the second host;
on the second host:
determining a length of the data packet;
tracking an amount of data in the data packet received from the first host;
calculating a difference between the length of the data packet and the amount of data received;
selecting a final constellation for a final transmission of data based on the difference; and
sending an indication of the final constellation to the first host.

11. The method of claim 10, wherein at least one of the steps of transmitting includes the step of transmitting an indication of a constellation to be used for a next transmission of the indication of a constellation from the second host.

12. The method of claim 11, further comprising the steps of:
receiving information that has been encoded; and
recovering the information via the next constellation.

13. The method of claim 12, wherein the step of recovering comprises the step of extracting at least an indication of a subsequent constellation to be used for a subsequent transmission between the first host and the second host.

14. The method of claim 13, further comprising using the subsequent constellation when transmitting the subsequent portions of the data packet between the first host and the second host.

15. The method of claim 10, further comprising the step of determining, between the first host and the second host, an initial constellation for an initial transmission between the first host and the second host.

16. The method of claim 15, wherein the step of determining comprises the step of sharing a short key established by a public key method, the short key providing an index to the initial constellation.

17. The method of claim 10, wherein the step of selecting a final constellation for a final transmission of data based on the difference comprises the steps of determining an amount of data conveyed by each constellation and selecting the final constellation such that the amount of data conveyed by the final constellation equals the difference.

18. A method of wirelessly communicating a data packet of length K bits between a first host and a second host, comprising the steps of:
iteratively transmitting wirelessly from the first host to the second host, a portion of data of the packet and an indication of a reply modulation scheme to be used by the second host to reply with a next modulation scheme to transmit to the second host a next portion of data; and
transmitting from the first host to the second host, a last portion of data using a last modulation scheme, wherein if a total number of bits of data sent for the packet from the first host to the second host exceeds K, at least one bit in the last portion of data is truncated, and wherein each iteration of wirelessly transmitting, after the first, of each portion of data is accomplished using a wireless modulation scheme indicated in a previous wireless transmission received from the second host.

19. The method of claim 18, further comprising the step of wirelessly determining an initial modulation scheme to be used for the first iteration of the wirelessly transmitting.

20. The method of claim 19, wherein the step of wirelessly determining an initial modulation scheme to be used for a first exchange of the first portion of data comprises the step of sharing a short key established by a public key method, the short key providing an index to the initial modulation scheme.

21. The method of claim 18, wherein iteratively transmitting comprises exchanging a next-to-last portion of data and an indication of the last modulation scheme to be used to exchange the last portion of data.

22. A method of securely communicating a data packet of length K from a first host to a second host, comprising the steps of:
encoding a first portion of the data packet to be transmitted from the first host to the second host, the encoding using an initial modulation scheme for transmitting the first portion of the data packet;
transmitting, via the initial modulation scheme, the first portion of the data packet along with an indication of a second modulation scheme with which the second host should respond to the first host;
receiving, from the second host, via the second modulation scheme, an indication of a third modulation scheme;
encoding a second portion of the data packet to be transmitted from the first host to the second host, the encoding using a third modulation scheme for transmitting the second portion of the data packet;
transmitting, via the third modulation scheme, the second portion of the data packet to the second host along with an indication of a fourth modulation scheme with which the second host should respond to the first host;
receiving, from the second host, via the fourth modulation scheme, an indication of a fifth modulation scheme; and on the first host, iteratively repeating steps of selecting a receive modulation scheme, transmitting only a portion of the packet and receiving an indication of a subsequent modulation scheme, with the step of transmitting in each iteration comprising transmitting a different portion of the packet and using as a transmit modulation scheme the subsequent modulation scheme received in the prior iteration.

23. The method of claim 22, further comprising the step of selecting, without constraint, the initial modulation scheme.

24. The method of claim 22, wherein the second modulation scheme is selected such that a first sum of a number of bits transmitted thereby and a second sum of all bits previously transmitted does not exceed K.

25. A computer-readable storage medium having computer-executable instructions for performing steps to securely communicate a data packet of length K bits between a first host and a second host, the steps comprising acts of:
selecting an initial transmit modulation scheme for transmission between the first host and the second host;
randomly selecting by the first host a receive modulation scheme;
transmitting by the first host to the second host, encoded according to the transmit modulation scheme, only a portion of the packet and an indication of the receive modulation scheme; and
receiving by the first host from the second host, encoded with the receive modulation scheme, and indication of a subsequent modulation scheme.

26. A computer-readable storage medium having computer-executable instructions for performing steps to securely transmit a data packet between a first host and a second host, comprising:
computer-readable storage medium on the first host having computer-executable instructions for performing acts of:
transmitting a first portion of the data packet from the first host to the second host;
continuing transmission of subsequent portions of the data packet until an entirety of the data packet has been transmitted, wherein each transmission from the first host and from the second host uses varying constellations;
computer-readable storage medium on the second host having computer-executable instructions for performing acts of:
determining a length of the data packet;
tracking an amount of data in the data packet received from the first host;
calculating a difference between the length of the data packet and the amount of data received;
selecting a final constellation for a final transmission of data based on the difference; and
sending an indication of the final constellation to the first host.

27. A computer-readable storage medium having computer-executable instructions for performing steps to wirelessly communicate a data packet of length K bits between a first host and a second host, the steps comprising acts of:
iteratively transmitting wirelessly from the first host and the second host, a portion of data of the packet and an indication of a reply modulation scheme to be used the second host to reply with a next modulation scheme to transmit to the second host a next portion of data; and
transmitting from the first host to the second host, a last portion of data using a last modulation scheme, wherein if a total number of bits of data sent for the packet from the first host to the second host exceeds K, at least one bit in the last portion of data is truncated, and wherein each iteration of wirelessly transmitting, after the first, of each portion of data is accomplished using a wireless modulation scheme indicated in a previous wireless transmission received from the second host.

28. A computer-readable storage medium having computer-executable instructions for performing steps to securely communicate a data packet of length K from a first host to a second host, the steps comprising acts of:
encoding a first portion of the data packet to be transmitted from the first host to the second host, the encoding using an initial modulation scheme for transmitting the first portion of the data packet;
transmitting, via the initial modulation scheme, the first portion of the data packet along with an indication of a second modulation scheme with which the second host should respond to the first host;
receiving, from the second host, via the second modulation scheme, an indication of a third modulation scheme;
encoding a second portion of the data packet to be transmitted from the first host to the second host, the encoding using a third modulation scheme for transmitting the second portion of the data packet;
transmitting, via the third modulation scheme, the second portion of the data packet to the second host along with an indication of a fourth modulation scheme with which the second host should respond to the first host;
receiving, from the second host, via the fourth modulation scheme, an indication of a fifth modulation scheme; and
on the first host, iteratively repeating steps of selecting a receive modulation scheme, transmitting only a portion of the packet and receiving an indication of a subsequent modulation scheme, with the step of transmitting in each iteration comprising transmitting a different portion of the packet and using as a transmit modulation scheme the subsequent modulation scheme received in the prior iteration.

* * * * *